United States Patent [19]
Ju et al.

[11] Patent Number: 5,958,475
[45] Date of Patent: Sep. 28, 1999

[54] HIGHLY FUNCTIONAL FERMENTED FODDER COMPOSITION AND PROCESS FOR PREPARING THE SAME

[75] Inventors: Jong Gon Ju, Kyonggi-Do; Woong Whan Yi, Seoul, both of Rep. of Korea

[73] Assignee: Barodon-Cashpia Corp., Kyonggi-Do, Rep. of Korea

[21] Appl. No.: 09/170,666

[22] Filed: Oct. 13, 1998

[30] Foreign Application Priority Data

Aug. 18, 1998 [KR] Rep. of Korea ........................ 98-33416

[51] Int. Cl.$^6$ ............................... A23K 1/175; A23K 3/03
[52] U.S. Cl. ............................... 426/54; 426/74; 426/630; 426/635; 426/807
[58] Field of Search ............................... 426/54, 630, 635, 426/807, 74

[56] References Cited

U.S. PATENT DOCUMENTS

| | | | |
|---|---|---|---|
| 3,961,081 | 6/1976 | McKenzie | 426/658 |
| 5,229,118 | 7/1993 | Campbell | 424/195.1 |

*Primary Examiner*—Chhaya D. Sayala
*Attorney, Agent, or Firm*—Ladas & Parry

[57] ABSTRACT

A highly functional fermented fodder and a process for preparing the same. The fodder composition according to the present invention comprises an aqueous solution containing 300–700 g of at least one compound selected from sodium silicate and potassium silicate, 300–700 g of at least one compound selected from potassium carbonate and sodium carbonate, 2–8 g of titanium dioxide, 5–15 g of boron and 80–150 g of sugar in 1 liter of water; and 100 kg to 500 kg of fodder. The fodder according to the invention enhances immunity of domestic animals from diseases, without further addition of veterinary medicines such as antibiotic agent or antibacterial agent; induces increase of body weight of animals to increase income of livestock farmers; and provides, after slaughter, excellent fleshy substance which contains rich amount of essential unsaturated fatty acids, particularly, ω-3 type fatty acids. The fodder can be prepared by natural fermentation at room temperature, needless of inoculating individual rice chaff for fermentation or of temperature control.

6 Claims, No Drawings

HIGHLY FUNCTIONAL FERMENTED FODDER COMPOSITION AND PROCESS FOR PREPARING THE SAME

BACKGROUND OF THE INVENTION

1. Field of the Invention

The present invention relates to highly functional fermented fodder composition and a process for preparing the same composition. More specifically, the present invention relates to highly functional fermented fodder composition which enhances immunity of domestic animals from diseases without further addition of veterinary medicines such as antibiotic agent or antifungal agent; induces increase of body weight of animals to increase income of livestock farmers; and provides, after slaughter, excellent fleshy substance which contains rich amount of essential unsaturated fatty acids, particularly, $\omega$-3 type fatty acids, the fodder being prepared by natural fermentation at room temperature, needless of inoculating individual strain for fermentation or of temperature control; and a process for preparing the same fodder composition.

2. Description of the Related Art

Recently, problems in the field of pig breeding, poultry farming and stock farming include death of livestock owing to veterinary diseases, and reduction of productivity. In order to overcome such problems, conventional functional livestock fodder, as in Korean Patent Publication No. 95-009944 (title of the invention: Fodder for animals which comprises antibiotic mixture of gentamycin and lincomycin or clindamycin, and ingredients therefor, and beverage containing the same) was prepared by blending or administrating antibiotic agent or antibacterial agent, or live bacterial preparations to conventional fodder.

However, such method of adding antibiotic agent or the like to fodder composition causes livestock abuse of veterinary drugs or harmful antibiotic agent, which results in loss of immune ability to diseases and requires more active antibiotics, thereby inducing substantial loss of self immune ability, and chronic diseases. In addition, excess use of antibiotics occasionally remains in meat or products of livestock to make them unsuitable as food.

In order to endow the meat of livestock or products such as eggs or milk with functions, conventional functional fodder contained vitamins or fish powder having $\omega$-3 type fatty acids to known fodder to give nutrient or function to livestock. However, such method is inconvenient as individual functional ingredients should be added to conventional fodder, as well as it increases cost of fodder owing to the ingredients. Besides, as the ratio of transfer from the functional ingredients to livestock or its product is so low that functions cannot be substantially given. Further, the method occasionally causes problem of fishy odor in meat of the products such as milk or eggs, owing to use of fish powder or fish oil.

Thus, in order to prevent diseases of livestock and to give functions to the product of livestock, it is rather preferred to optimize body condition of livestock to increase self immune ability than to administrate individual functional ingredient or harmful chemicals such as antibiotics; and it is preferred to make the nutrients of fodder completely absorbed to increase content of unsaturated fatty acids such as $\omega$-3 fatty acid being good for human body but decrease content of saturated fatty acids which are harmful to human body, without further addition of functional ingredients such as fish oil.

The process for preparing conventional fermented fodder comprised inoculating enzyme preparation, yeast or other fermenting strains on residual rice, crushed rice fodder, rice chaff, or the like, and fermenting it in a fermenting apparatus at a temperature of about 60° C. or more for a certain time. However, such process is inconvenient because individual enzyme preparation or fermenting strain should be inoculated, and the process requires a certain fermenting apparatus, and the fermenting condition is not easy to control so that the mixture is apt to be corrupted. In order to solve the problem, it is necessary to remove harmful corruptive strains which exist in rice chaff or the like, and increase fermenting strains to proceed fermentation, without individual inoculation of enzyme preparations or fermenting strains, or fermenting apparatus, or inconvenient operation such as control of temperature condition.

The present inventors found that animals and plants keep their lives by metabolism of cells (basic units of organisms) which exchange external material and optimize internal environment through cell membrane, and that preventing loss of cell membrane and activating immune cell action improves immune ability of organisms and promotes uptake of external nutrient. Thus, the inventors constituted silicon compounds (which is an essential mineral component and activates cells in vivo), and sodium and potassium compounds (which are main media of material transfer through cell membrane), in the forms suitable to activate metabolism in vivo, and supplied those compounds, so that they intented to develop a fodder composition which can increase immune ability of livestock against diseases and maximize uptake of nutrient.

SUMMARY OF THE INVENTION

The object of the present invention is to overcome the problems described above, and provides a highly functional fermented fodder which maximizes self immune ability against various diseases with increasing immune cells by promoting metabolism of livestock without adding individual antibiotic agent by supplying silicon compounds, sodium compounds and potassium compounds (which affect cells of living organisms) in the forms maximizing biological activity, to induce increase of body weight of livestock and thus increase income of livestock farmers; and gives the product such as flesh and/or eggs or milk in which saturated fatty acids causing adult diseases were reduced but unsaturated fatty acids (which are good for human body) were increased; and can be naturally fermented at room temperature without inoculation of individual fermenting strain or control of strict temperature control during the preparation of the fodder; and a process for preparing the same fodder.

In order to achieve the objects described above, the present invention provides highly functional fodder composition which is prepared by mixing an aqueous solution of sodium silicate and/or potassium silicate, potassium carbonate and/or sodium carbonate, titanium dioxide, boron and sugar to conventional fodder comprising rice chaff, corn or bean, and standing the mixture at room temperature for about 4 days to dry the mixture, and a process for preparing the fodder composition.

More specifically, the present invention relates to a highly functional fermented fodder composition which is prepared by dissolving 300–700 g of at least one compound selected from sodium silicate and potassium silicate, 300–700 g of at least one compound selected from potassium carbonate and sodium carbonate, 2–8 g of titanium dioxide, 5–15 g of boron and 80–150 g of sugar in I liter of hot water at a temperature of 70° C. or more; standing the mixture at room temperature to give viscous liquid composition; adding the viscous composition to conventional fodder such as rice chaff or the like, as it is, or as diluted as an aqueous solution to facilitate mixing step; fermenting the mixture at room temperature for 4–5 days; drying the mixture with hot air at 70–80° C.; and cooling the mixture. A process for preparing the same fodder composition is also provided.

In the present invention, sodium silicate and potassium silicate both may be used, or one of the compounds may be selected without causing any problem in achieving the object of the present invention. However, in case of both compounds are used, the mixed ratio is preferably 1:1. In case of potassium carbonate and sodium carbonate, both compounds may be used, or one of the two may be selected. If both compounds are used, the mixed ratio is preferably 1:1.

In the present invention, sodium silicate and potassium silicate both may be used, or one of the compounds may be selected without causing any problem in achieving the object of the present invention. However, in case of both compounds are used, the mixed ratio is preferably 1:1. In case of potassium carbonate and sodium carbonate, both compounds may be used, or one of the two may be selected. If both compounds are used, the mixed ratio is preferably 1:1.

DESCRIPTION OF PREFERRED EMBODIMENTS

Now, The present invention is described with reference to Examples, however, it should not be noted that the present invention is restricted to these examples.

EXAMPLE 1

Preparation of aqueous solution

In 1 liter of water kept at 80° C., 400 g of sodium silicate, 400 g of sodium carbonate, 5 g of titanium dioxide, 12 g of boron and 170 g of sugar were subsequently dissolved, and the mixture was stood at room temperature for 24 hours to prepare a viscous liquid composition.

EXAMPLE 2

Preparation of fodder

To the raw material for fodder in which 100 kg of raw rice chaff and 300 g of sugar were blended, 15-fold diluted liquid composition (water content: 33%) prepared in Example 1 was added and the mixture was stirred. The half product of fodder was fermented for about 4 days and dried with hot air at 70° C. to give fodder composition.

EXAMPLE 3

Experiment on change of fermenting strains

In order to examine the effect of the aqueous composition prepared in Example 1 on the fermentation of rice chaff, strains existing in raw rice chaff before mixing with the aqueous composition and those after the mixing were examined.

TABLE 1

| Strain | Before mixing with rice chaff | After mixing with rice chaff |
|---|---|---|
| Agarobacterium tumefaciens | 7.0 × 106 | x |
| Pseudomonas aeruginosa | 2.0 × 105 | x |
| Pseudomonas cepacia | 6.4 × 105 | x |

TABLE 1-continued

| Strain | Before mixing with rice chaff | After mixing with rice chaff |
|---|---|---|
| Enterobacter cloacae | 4.0 × 105 | x |
| Enterobacter agglomerans | 4.0 × 105 | x |
| Cryptococcus humicolus | 9.2 × 104 | 3.2 × 108 |

As can be found from above results, some harmful bacteria, which involve various bacterial infection such as infection in respiratory organs, or corruption (for example, Agarobacterium tumefaciens, Pseudomonas aeruginosa, Pseudomonas cepacia, Enterobacter cloacae, Enterobacter agglomerans, or the like), were found in rice chaff before addition of the liquid composition, but all these harmful bacteria disappeared after addition of the liquid composition, while Cryptococcus humicolus, a kind of yeasts which participate in fermentation, was increased by about 3500-folds or more after addition of the liquid composition.

Thus, it is confirmed that the liquid composition according to the present invention multiplies fermenting strains in rice chaff, so that fermentation can be proceeded without further addition of fermenting strains.

EXAMPLE 4

Immune test in chickens

About one hundred chickens were fed with the fodder composition prepared in Example 2 for one month, and the change of immune cells was examined. After feeding with the fodder composition of the present invention for one month, peripheral blood leukocytes of chicken were isolated according to the process of David et al. (1987), and the effects on immune cells in blood, that is major histocompatibility complex, and on distribution of lymphocyte subgroup were examined by the use of leukocyte surface monoclone antibody and flow cytometry (David et al., 1990). The results are shown in Table 2.

TABLE 2

| Immune cells | Before (%) | After (%) |
|---|---|---|
| MHC-class I expressing cells | 51.38 | 73.49 |
| CD4 T lymphocytes | 17.20 | 33.28 |
| CD8 T lymphocytes | 19.00 | 22.68 |
| B lymphocytes | 18.39 | 20.30 |

As can be seen from the above results, distribution of MHC-class I antigen expressing cells and CD4 T lymphocytes, which essentially participate host immune mechanism and disease protecting mechanism, were largely increased in chickens, and B lymphocytes, which works in antibody secretion, also were increased. It was found that immune cells generally increased in chickens after administering the fodder of the present invention.

EXAMPLE 5

Immune test in pigs

About one hundred pigs were fed with the fodder composition prepared in Example 2 for one month, and the change of immune cells was examined. After feeding with the fodder composition of the present invention for one month, peripheral blood leukocytes were isolated according to the process of David et al. (1987), and the effects on immune cells in blood, that is major histocompatibility complex, and on distribution of lymphocyte subgroup were examined by the use of leukocyte surface monoclone antibody and flow cytometry (David et al., 1990). The results are shown in Table 3.

TABLE 3

| Immune cells | Before (%) | After (%) |
| --- | --- | --- |
| CD2 T lymphocytes | 53.67 | 58.32 |
| CD4 T lymphocytes | 16.51 | 27.85 |
| Granulocytes | 5.0 | 48.19 |

As can be seen from the above results, distribution of CD4 T lymphocytes, which essentially participate host immune mechanism and disease protecting mechanism, was largely increased in pigs, as was in chickens, and, particularly, Granulocytes, which essentially participate in primary protecting mechanism of host, were largely increased. Thus, it was found that immune cells participating cellular immune against bacteria or virus generally increased in pigs after administering the fodder of the present invention.

EXAMPLE 6

Immune test in cows

About one hundred cows were fed with the fodder composition prepared in Example 2 for one month, and the change of immune cells was examined. After feeding with the fodder composition of the present invention for one month, peripheral blood leukocytes were isolated according to the process of David et al. (1987), and the effects on immune cells in blood, that is major histocompatibility complex, and on distribution of lymphocyte subgroup were examined by the use of leukocyte surface monoclone antibody and flow cytometry (David et al., 1990). The results are shown in Table 4.

TABLE 4

| Immune cells | Before (%) | After (%) |
| --- | --- | --- |
| MHC-class II expressing cells | 48.40 | 53.60 |
| CD4 T lymphocytes | 6.40 | 8.90 |
| N lymphocytes | 4.40 | 6.20 |
| B lymphocytes | 30.00 | 52.20 |
| Monocytes | 4.70 | 19.10 |
| Granulocytes | 36.60 | 52.10 |

As can be seen from the above results, T lymphocytes did not prominently increased, but monocytes (which are precursor of macrophage having engorging action), granulocytes (cells which mainly participate primary protecting mechanism of host) and B lymphocytes (which secretes antibodies) largely increased. Thus, it was found that immune cells participating cellular immune generally increased after administering the fodder of the present invention.

As shown in Examples 4–6, it was confirmed that the fodder composition according to the present invention affected on immune mechanism of livestock (chickens, pigs and cows), especially, the fodder composition plays an important role in increasing immune cells, so that immune mechanism to effectively response against pathogenic bacteria from outside can be secured.

EXAMPLE 7

Effect on increasing body weight of pigs

The fodder prepared in Example 2 was mixed with conventional blended fodder (manufactured by Woosung Fodder Co., Ltd.), and the resultant mixed fodder was supplied to a test group (fifty pigs) for six months. For a control group (fifty pigs), only commercial blended fodder (Woosung Fodder Co., Ltd.) was supplied. The change of body weight (average value) and efficiency of the fodder were measured.

Hybrids from three breeds (large white, red race, yorkshire) were used for the test.

TABLE 5

| | Body weight (alive) (kg) | Body weight (slaughtered) (kg) | Efficiency of fodder |
| --- | --- | --- | --- |
| Test group | 125.8 | 98.8 | 0.325 |
| Control group | 106.4 | 84.1 | 0.272 |

As a result, test group showed about 20% increase of body weight as compared to the control group, and efficiency of fodder of test group was higher than the value (0.316) recommended by Stockbreeding Research Center.

EXAMPLE 8

Comparison of components of pork

In order to examine the effect of the fodder according to the present invention on fatty acid components contained in the flesh of pork, the fodder composition of the present invention was supplied to pigs for 6 months (test group), while conventional blended fodder was supplied to pigs for 6 months under identical conditions (control group), and then the components of flesh of pork from each group were analysed and compared.

For the test group (fifty pigs), fodder prepared according to Example 2 was supplied for 6 months according to conventional methods, while conventional blended fodder was supplied for the control group for 6 months. The components contained in flesh of pork from each group were analyzed.

TABLE 6

| Component | Test group (%) | Control group (%) |
| --- | --- | --- |
| Saturated fatty acids | 31 | 42 |
| Unsaturated fatty acids | 69 | 58 |
| Linoleic acid | 32 | 7.1 |
| ω-3 | 2.6 | 0.61 |

As a result, the pork from pigs which had been fed with the fodder according to the present invention showed about 30% decrease of content of saturated fatty acids which are main origin of adult diseases, while it showed about 20% increase of unsaturated fatty acids which are good for human body. Further, the pork from pigs which had been fed with the fodder of the present invention contained as much as 2.6% of ω-3 fatty acid which was scarcely found in the pork from control group. Thus, the pork from the test group which had been fed with the fodder of the present invention is found to be suitable for preventing adult diseases.

As described above with referring to Examples, the highly functional fermented fodder according to the present invention increases immune ability against diseases by activating self-immune activity of fowls and livestock, and increases ω-3 fatty acid content in the meat of the livestock without further adding individual functional ingredients and decreases the content of saturated fatty acids which are harmful to human body. According to the process for preparing the fodder of the present invention, fermented fodder can be prepared without individual fermenting apparatus or strict control of fermenting condition, by removing harmful corruptive bacteria which exist in conventional fodder and multiplying fermenting microorganism in the fodder.

What is claimed is:

1. A fermented fodder composition which comprises an aqueous solution containing 300–700 g of at least one compound selected from sodium silicate and potassium silicate, 300–700 g of at least one compound selected from potassium carbonate and sodium carbonate, 2–8 g of titanium dioxide, 5–15 g of boron and 80–150 g of sugar in 1 liter of water; and 100 kg to 500 kg of fodder.

2. The fermented fodder composition according to claim 1, wherein the fodder comprises one or more material selected from a group consisting of rice chaff, corn, soy bean chaff, bean, African millet, wheat and barley.

3. A process for preparing a fermented fodder composition, which comprises dissolving 300–700 g of at least one compound selected from sodium silicate and potassium silicate, 300–700 g of at least one compound selected from potassium carbonate and sodium carbonate, 2–8 g of titanium dioxide, 5–15 g of boron and 80–150 g of sugar in I liter of water; mixing the aqueous mixture with fodder; fermenting the resultant mixture; and drying and cooling the mixture.

4. The process according to claim 3, wherein the fodder comprises one or more material selected from a group consisting of rice chaff, corn, soy bean chaff, bean, African millet, wheat and barley.

5. The process according to claim 3, wherein the aqueous solution is diluted with 10–15 times of water and mixed with the fodder.

6. The process according to claim 3, wherein the fermentation is performed at a temperature of 20–40° C. without addition of any microorganism.

* * * * *